(12) United States Patent
Sinn

(10) Patent No.: US 10,404,598 B1
(45) Date of Patent: Sep. 3, 2019

(54) MANAGING NEXT HOP GROUPS IN ROUTERS

(71) Applicant: Amazon Technologies, Inc., Seattle, WA (US)

(72) Inventor: Frederick David Sinn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/589,537

(22) Filed: May 8, 2017

(51) Int. Cl.
H04L 12/745 (2013.01)
H04L 12/773 (2013.01)
H04L 12/741 (2013.01)

(52) U.S. Cl.
CPC ............ H04L 45/748 (2013.01); H04L 45/54 (2013.01); H04L 45/60 (2013.01)

(58) Field of Classification Search
CPC ........ H04L 45/54; H04L 45/60; H04L 45/748
See application file for complete search history.

(56) References Cited

U.S. PATENT DOCUMENTS

| | | | | |
|---|---|---|---|---|
| 2004/0249803 A1* | 12/2004 | Vankatachary | .......... | H04L 45/00 |
| 2005/0073958 A1* | 4/2005 | Atlas | .......... | H04L 45/00 370/238 |
| 2005/0141517 A1* | 6/2005 | Choi | .......... | H04L 45/00 370/395.31 |
| 2007/0030855 A1* | 2/2007 | Ribiere | .......... | H04L 12/5692 370/401 |
| 2008/0095163 A1* | 4/2008 | Chen | .......... | H04L 45/16 370/392 |
| 2009/0067331 A1* | 3/2009 | Watsen | .......... | H04L 45/00 370/235 |
| 2011/0069706 A1* | 3/2011 | Sen | .......... | H04L 45/00 370/392 |
| 2011/0128959 A1* | 6/2011 | Bando | .......... | H04L 45/745 370/392 |
| 2011/0235545 A1* | 9/2011 | Subramanian | .......... | H04L 45/04 370/254 |
| 2013/0343176 A1* | 12/2013 | Bashandy | .......... | H04L 41/0663 370/219 |
| 2014/0286155 A1* | 9/2014 | Bashandy | .......... | H04L 41/0663 370/221 |
| 2014/0328166 A1* | 11/2014 | Wen | .......... | H04L 45/22 370/228 |
| 2017/0264552 A1* | 9/2017 | Duda | .......... | H04L 47/17 |
| 2018/0006943 A1* | 1/2018 | Dubey | .......... | H04L 45/745 |

* cited by examiner

*Primary Examiner* — Benjamin H Elliott, IV
(74) *Attorney, Agent, or Firm* — Klarquist Sparkman, LLP

(57) ABSTRACT

Technologies are provided for organizing network routes using network topology information. A router in a computer network can be configured to group network address prefixes in a routing table based on origin device clusters. The router can be configured to receive a routing protocol message comprising one or more prefixes and associated next hops. The router can identify an origin device cluster based on information contained in the message. The router can create a next hop group and associate it with the origin device cluster. The router can add the prefixes and next hops in the message to the next hop group. When an updated next hop list for a prefix is received at the router, the router can identify an origin device cluster for the prefix, identify a next hop group associated with the origin device cluster, and update the next hop group using the updated next hop list.

20 Claims, 10 Drawing Sheets

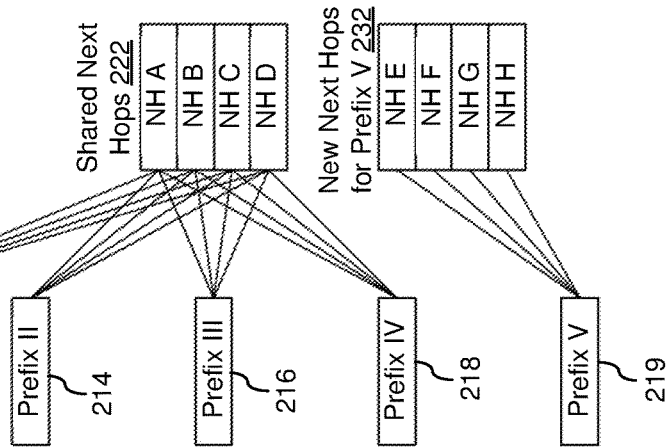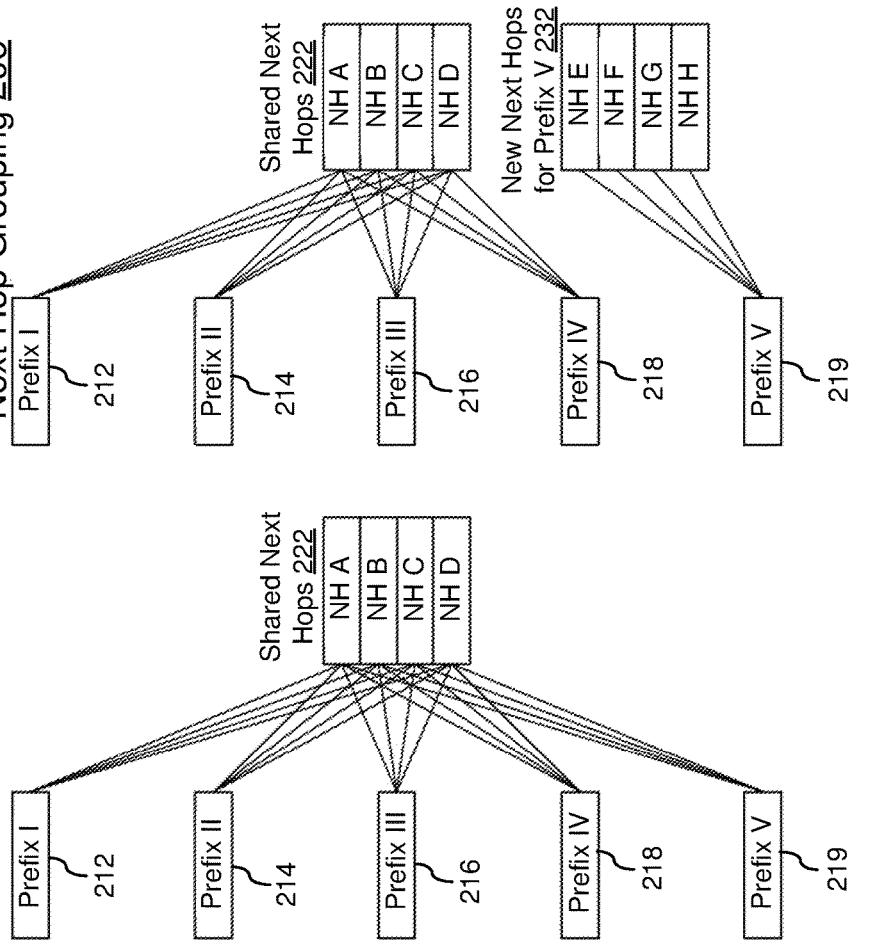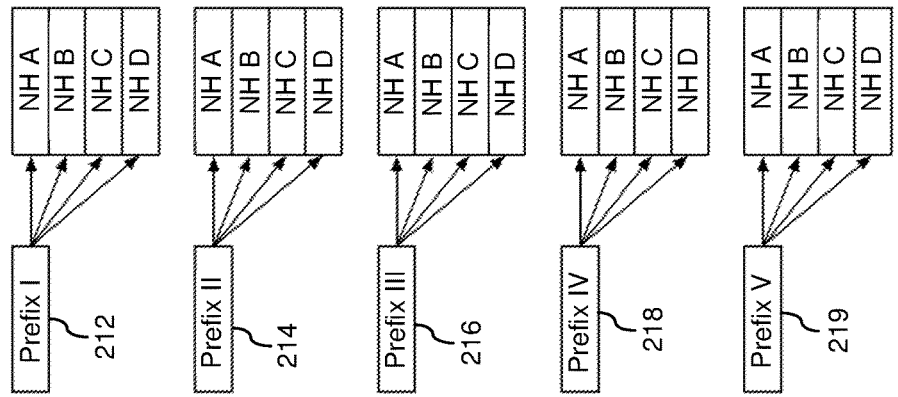

FIG. 9

```
Border Gateway Protocol - UPDATE Message 900
...
    Withdrawn Routes Length: 0
912━Path Attribute - ORIGIN: EGP
916━Path Attribute - AS_PATH: [207, 419, ..., 5552]━914
    Path Attribute - NEXT_HOP: 192.168.10.2
...
918━NLRI: 62.112.65.0/24
```

MANAGING NEXT HOP GROUPS IN ROUTERS

BACKGROUND

Network routers can be used to forward data packets from a source computing device to a destination computing device in a computer network. In larger networks, a data packet may be routed through multiple routers before reaching its ultimate destination. When one router transmits a data packet to a neighboring router in the network, the transfer can be referred to as a "hop." When a router receives a data packet and identifies a neighboring router to which the data packet should be transmitted, it can be said to have identified a "next hop" for the data packet. At least some routers are configured to determine next hops for data packets using routing tables. A routing table can be used to determine associations between network address prefixes and next hops to which data packets matching the network address prefixes should be routed. Network routing protocols exist that enable routers to build routing tables and converge on a shared network topology. Example routing protocols include the Border Gateway Protocol (BGP), the Open Shortest Path First protocol (OSPF), and the Intermediate System to Intermediate System protocol (IS-IS).

Previous strategies for organizing associations between network address prefixes and next hops in a network include associating each distinct network address prefix with a separate set of next hop identifiers, and grouping network address prefixes based on shared sets of next hops.

BRIEF DESCRIPTION OF THE DRAWINGS

FIGS. 2A-C depict prior art next hop grouping strategies.

FIG. 9 depicts an example border gateway protocol (BGP) update message.

DETAILED DESCRIPTION

Previous strategies for managing routing tables for router in a network usually do not account for information about the given network's topology. For example, one previous grouping strategy groups network address prefixes that share a common next hop (or set of next hops) into a single next hop group. This strategy does not consider the ultimate destinations of the network address prefixes, and attempts to create as small a number of next hop groups as possible. While such a strategy can make efficient use of router memory in some cases, it can make updating the next hop groups computationally expensive in some cases. For example, when a route for a network address prefix changes due to a remote failure, the network address prefix must be moved to a separate next hop group. In some cases, this necessitates the creation of a new next hop group in the routing table. Furthermore, in systems comprising multiple routers, this process may be repeated for multiple routers in the network. Additionally, if multiple network address prefixes must be rerouted due to the remote failure, the process often repeats for each prefix. The routing delay that can be attributed to such re-convergence operations in the network can be significant.

At least some of the embodiments of the technologies described herein address these problems by dynamically organizing routing tables using network topology information. For example, data inside of one or more routing protocols can be used to group network address prefixes into next hop groups based on common origin device clusters. When a routing path to a given origin device cluster changes (such as in the event of a remote failure), only a single next hop group in the router's routing table has to be updated. In at least some cases, this can reduce the overall computational load required to update routers with a changed network routes, and thus can reduce the overall cost of re-convergence in the network.

In at least one embodiment, a network routing protocol message can be received by a network router. The network router can identify an origin device cluster from which the routing protocol message originated based on data in the routing protocol message. The router can create a next hop group for the origin device cluster if one does not already exist, and can add network address prefix and next hop information contained in the routing protocol message to the next hop group for the origin device cluster. In a different or further embodiment, an updated next hop list for a given network address prefix is received by the router as part of a routing protocol message. The router can identify an origin device cluster for the network address prefix, look up a next hop group associated with the origin device cluster, and update the next hop group using the updated next hop list.

Figure 1:
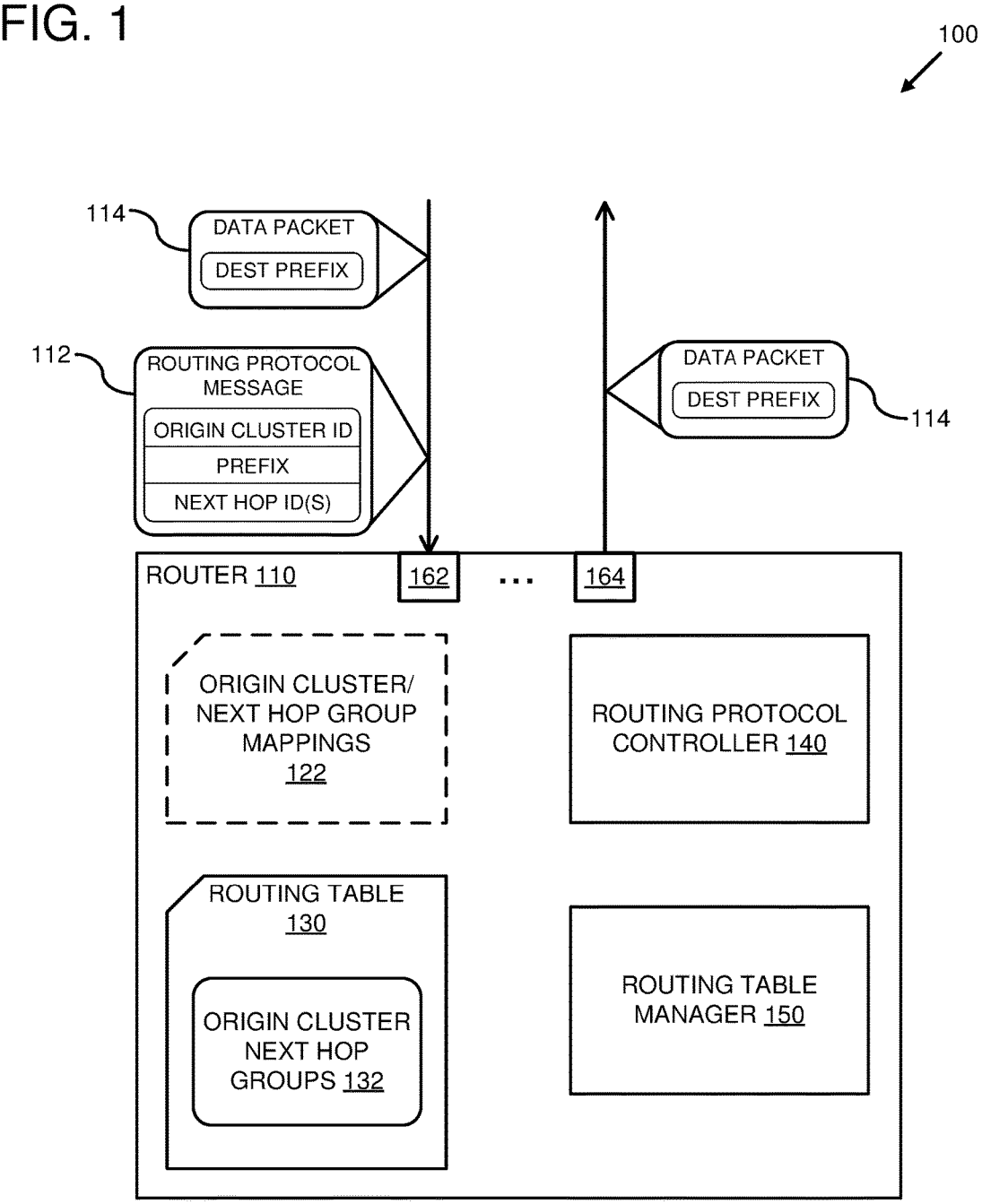
FIG. 1 is a system diagram depicting an example system comprising a router configured to create next hop groups based on origin device clusters.

FIG. 1 is a system diagram depicting an example system 100 for routing data packets in a computer network, comprising a router 110 configured to create next hop groups 132 based on origin device clusters.

The router 110 comprises multiple network communication ports 162-164. The router 110 can be configured to receive routing protocol messages, such as routing protocol message 112, via one or more of the network communication ports 162-164. The router 110 can also be configured to receive and transmit data packets, such as data packet 114, via one or more of the network communication ports 162-164. Although the routing protocol message 112 and the data packet 114 are depicted as being received over a same port 162, it is possible for various routing protocol messages and data packets to be received via different network communication ports.

The routing protocol message 112 contains a network address prefix (such as one or more most-significant bits of an Internet Protocol (IP) address), and one or more next hop identifiers associated with the network address prefix. In at least some embodiments, the network address prefix can be a subnet mask. A next hop identifier identifies a computing device to which a data packet destined for an associated network address prefix can be transmitted as a next step (or "next hop") towards the destination. The routing protocol message 112 also contains information that can be used to identify an origin device cluster from which the routing protocol message 112 originated.

The router 110 comprises a routing table 130 and a routing table manager 150. The routing table manager 150 can be configured to receive the routing protocol message 112 via the port 162, and to analyze the routing protocol message 112 to identify the origin device cluster from which the routing protocol message 112 originated. The routing table manager 150 can look up a next hop group, of the next hop groups 132, for the identified origin device cluster in the routing table 130. If the next hop groups 132 do not include a next hop group associated with the identified origin device cluster, then the routing table manager 150 can create a new next hop group, associate the new next hop group with the identified origin device cluster, and add the new next hop group to the routing table 130. The routing table manager 150 can then add an entry to the next hop group for the identified origin device cluster that will associate the network address prefix in the routing protocol message 112 with the one or more next hop identifiers in the routing protocol message 112.

The routing table manager 150 can comprise one or more hardware and/or software components of the router 110.

In at least one embodiment, the router 110 comprises a list of mappings 122 between the next hop groups 132 and origin device clusters. For example, the list of mappings can comprise one or more records associating identifiers for origin device clusters and identifiers for the next hop groups 132. The list of mappings 122 can be stored in a memory and/or storage of the router 110 (not shown). In such an embodiment, looking up the next hop group for the identified origin device cluster can comprise searching the mappings 122 between the origin device cluster identifiers and the next hop groups 132 and retrieving of record in the mappings 122 associating and identifier for the origin device cluster with a next hop group, of the origin cluster next hop groups 132, in the routing table 130.

The router 110 can be configured to receive the data packet 114 over the network communication port 162. The router 110 can comprise a routing protocol controller 140 configured to analyze the data packet 114 to identify a destination of the data packet 114. The routing protocol controller 140 can use the routing table 132 identify a next hop device to which the data packet 114 should be transmitted, and to transmit the data packet 114 to the identified next hop device via the network communication port 164.

The data packet 114 can contain a destination network address prefix. For example, the data packet can contain a destination IP address comprising an IP address prefix. The routing protocol controller 140 can search the routing table 130 for a next hop group, of the origin cluster next hop groups 132, which contains a network address prefix matching the destination network address prefix. The routing protocol controller 140 can select a next hop identifier in the next hop group associated with the matching prefix and can transmit the data packet 114 to a next hop device associated with the next hop identifier via the network communication port 164.

The routing protocol controller 140 can comprise one or more hardware and/or software components of the router 110.

In any of the examples described herein, a router can be a computing device configured to receive and forward data packets within a computer network and/or between computer networks. In at least some embodiments, a router can be referred to as a switch. The router can be configured to create and maintain a routing table based on routing protocol messages received via one or more computer networks. The router can comprise multiple communication ports connected to other routers (and/or other types of computing devices). The router can be configured to receive data packets from other routers (and/or other computing devices) via one or more of the communication ports. The router can use data contained in the data packets and the routing table to identify next hop routers (and/or other computing devices) for the data packets and to transmit the data packets to the identified next hops via one or more of the communication ports.

In any of the examples described herein, an origin device cluster can be a group of networked computing devices (such as routers) that can be identified as an origin for one or more network address prefixes. As an origin for a network address prefix, an origin device cluster can be regarded by routers in the network as an ultimate destination for data packets destined for network addresses that begin with the network address prefix. In at least some cases, an origin device cluster can be controlled by a service provider (such as a Network Access Provider, an Internet Service Provider, an Internet Transport Provider, a Network Backbone Provider, etc.). Example network address prefixes include IP address prefixes, subnet masks, etc. Example origin device clusters include separate data centers, subnets, etc. In practice, any group of networked computing devices that can be identified as a destination for a given network address prefix can be an origin device cluster. One or more computing devices in an origin device cluster can generate routing protocol messages that are transmitted through a computer network and/or between computer networks. The generated routing protocol messages can identify routes through the computer network that can be used by routers in the network to transmit data packets towards computing devices in the origin device cluster. Using at least some of the techniques described herein, a router can be configured to receive the routing protocol messages, identify the origin device clusters based on data in the routing protocol messages, and group prefixes that originate in the origin device clusters into separate next hop groups in a routing table.

FIGS. 2A-C depicted various prior art routing table grouping strategies. FIG. 2A depicts a grouping strategy 202 wherein each distinct network address prefix is associated with a separate set of next hops. The network address prefixes 212-219 each are associated with separate sets of next hops. Under the grouping strategy 202, different prefixes can be associated with separate sets of next hops, even when some of the network address prefixes are associated with one or more common next hop identifiers. The scenario depicted in FIG. 2A is a case in which all of the network address prefixes 212-219 are associated with the same four next hop identifiers, but since each prefix is separately tied to its own set of next hops, the next hop identifiers are repeated in the routing table for each of the prefixes 212-219. Creating a separate set of next hops for each unique prefix can result in relatively fast look up speeds within the routing table. However, in some cases this strategy can consume a large amount of router memory and/or storage space since a large amount of next hop information must be repeated for each prefix.

To reduce the amount of memory required for the routing table, many router developers moved to a next hop grouping strategy 204 depicted in FIG. 2B. In the next hop grouping strategy 204, prefixes that share a set of common next hop identifiers can be grouped together into a single next hop group. For example, a single next hop group is created for the set of shared next hop identifiers 222 and is associated with all of the prefixes 212-219. The next hop grouping strategy 204 can still provide relatively fast look up speeds, but in some cases it can consume significantly less memory than the grouping strategy 202.

However, updating a routing table organized using the next hop grouping strategy 204 can be costly in the event of a remote failure. A remote failure (i.e., a failure that occurs outside of the local area network containing the given router) can result in a routing update that changes associations between one or more prefixes and one or more next hop identifiers. For example, FIG. 2C depicts an example rerouting 206 for the prefix 219 after a remote failure. In this example, the remote failure resulted in the prefix 219 being associated with a set of new next hop identifiers 232. In order to update the routing table organized using the next hop grouping strategy 204, a new next hop group is created to store the new set of next hop identifiers (or alternatively an existing next hop group containing the set of next hop identifiers 232 can be located in the routing table), and the prefix 219 is removed from the previous next hop group and added to the new next hop group. In configurations comprising multiple routers in a local area network, this process of creating a new next hop group (or locating another existing next hop group) for the prefix 219 may be repeated in multiple intermediate routers. Additionally, if the remote failure affects more than one network address prefix, the regrouping process may be repeated for each affected prefix, since the next hop grouping strategy 204 does not have an understanding of relationships between network address prefixes and originating device clusters in the network topology.

Figure 3:
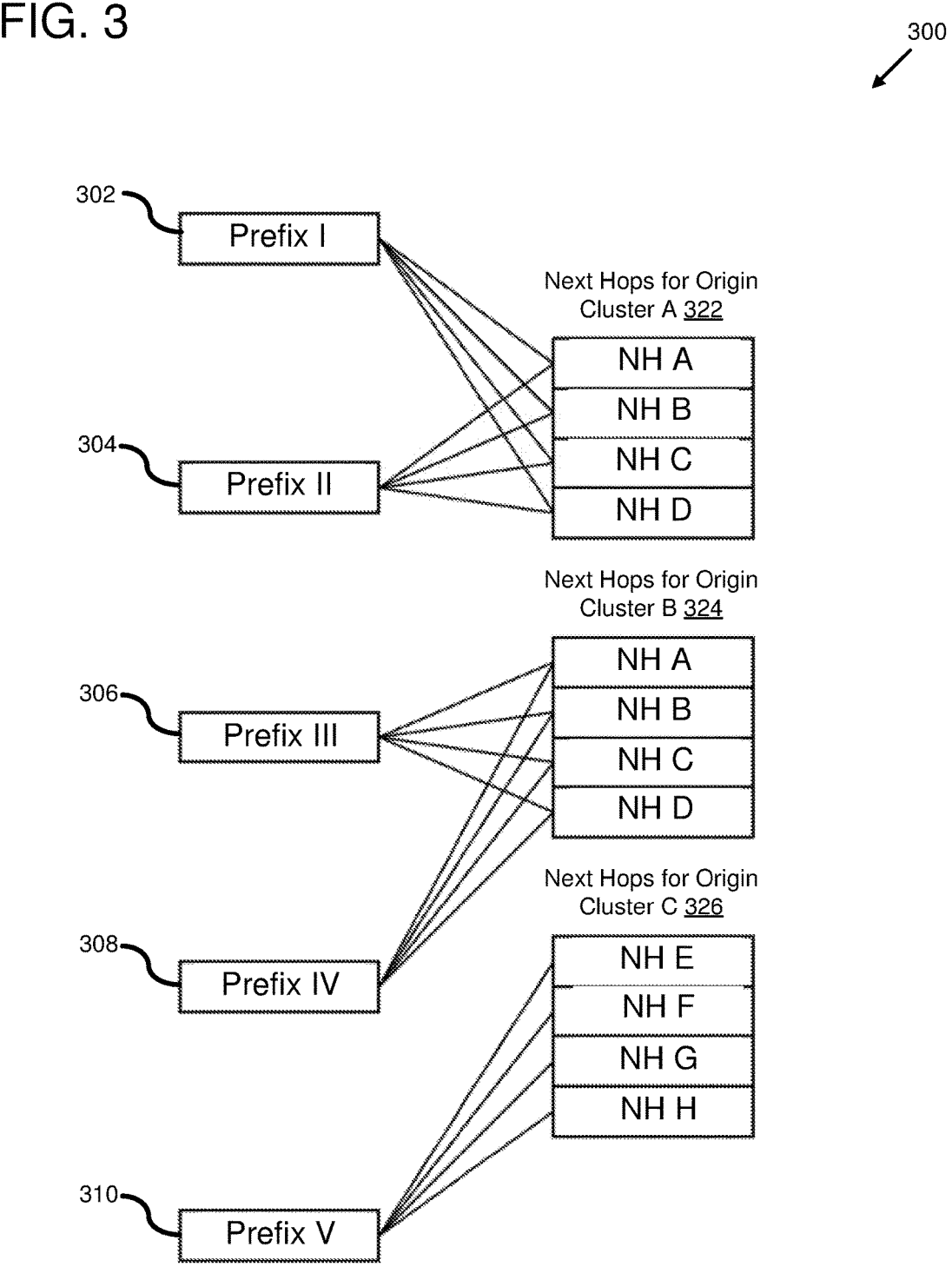
FIG. 3 depicts an example next hop grouping strategy based on common origin device clusters.

FIG. 3 depicts an example next hop grouping strategy 300 based on common origin device clusters. In the next hop grouping strategy 300, next hop groups are created that group network address prefixes based on the origin device clusters with which the network address prefixes are associated. A network address prefix can be associated with an origin device cluster if the origin device cluster is identified as a destination of network addresses that begin with the associated network address prefixes. In the example depicted in FIG. 3, network address prefixes 302 and 304 are associated with a next hop group 322 since those prefixes are both associated with the same origin device cluster A. Similarly, network address prefixes 306 and 308 are associated with to a next hop group 324 since those prefixes are both associated with a same origin device cluster B. The prefix 310 is associated with a separate next hop group 326 since it is associated with a different origin device cluster C. The example grouping strategy 300 can provide relatively fast look up speeds and, in at least some cases, can reduce the overall cost associated with updating the network routing table in response to remote failures. For example, if a remote failure caused the route to the origin device cluster B to change, the set of new next hop identifiers would be generated for prefixes associated with the origin device cluster B (e.g., prefixes 306 and 308). However, only a single next hop group (324) needs to be updated in response to the change.

Any of the example systems described herein can be used to organize network address prefixes and associated next hop identifiers based on common origin device clusters.

Figure 4:
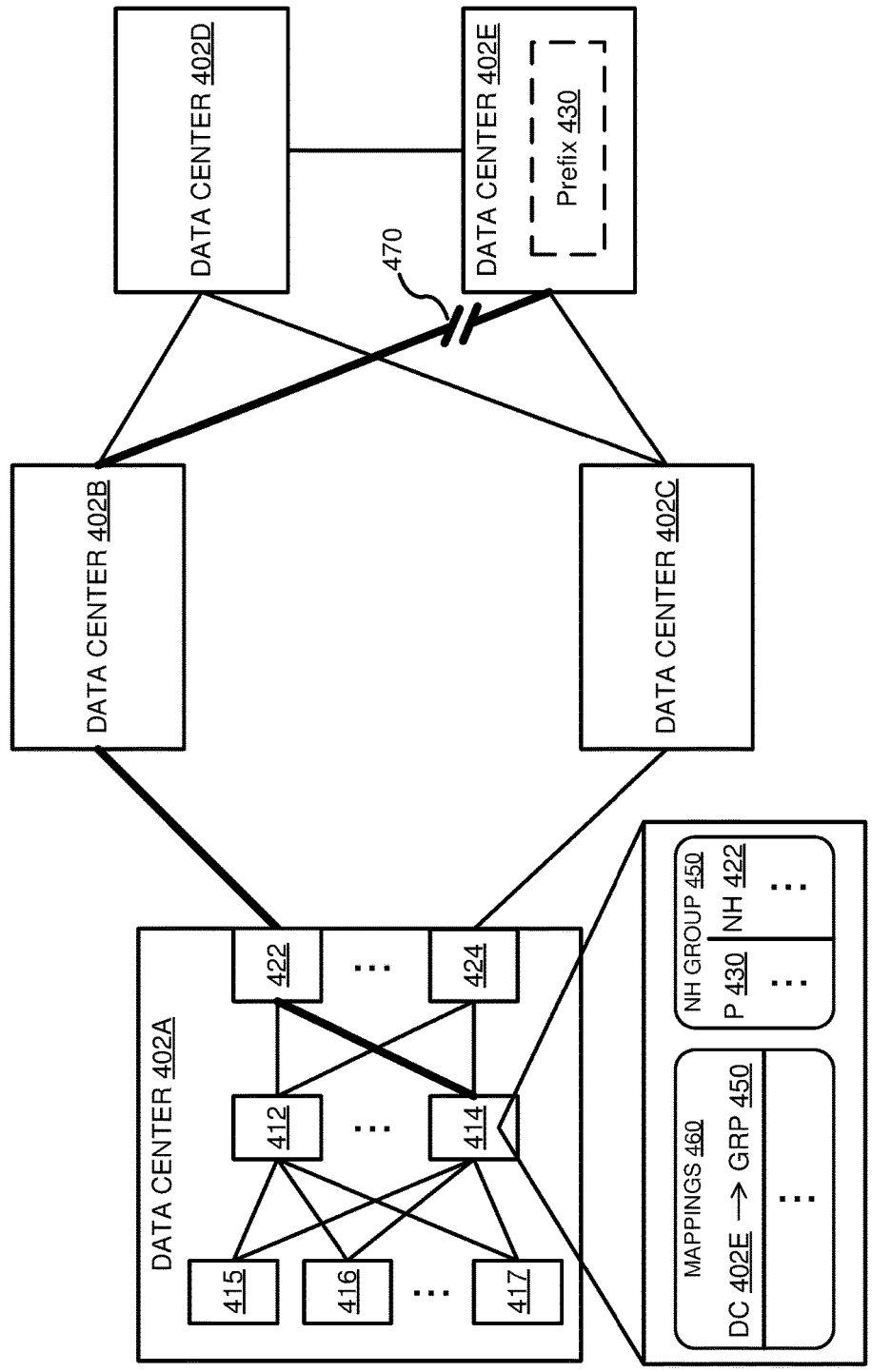
FIGS. 4-5 depict an example wide area network comprising a router configured to route data packets based on origin device cluster next hop groups.

FIG. 4 depicts an example wide area network 400 comprising a router 414 configured to route data packets using origin device cluster next hop groups. The wide area network 400 comprises multiple data centers 402A-E connected by multiple communication routes. The data center 402A comprises multiple edge routers 422-424 and multiple internal routers 412-417 configured in a local area network. The edge routers 422-424 are configured to communicate with external routers in the other data centers 402 B-E. For example, the edge router 422 is depicted as being configured to communicate with the data center 402B, and the edge router 424 is depicted as being configured to communicate with the data center 402C.

The internal router 414 comprises multiple next hop groups (e.g., next hop group 450) that the router 414 can use to route data packets in the network. For example, the next hop group 450 contains one or more entries indicating that the edge router 422 is a next hop for data packets received at the router 414 that are destined for a network address prefix 430. The router 414 comprises a mapping table 460 that associates data center identifiers with next hop groups. For example, the mapping table 460 contains a mapping record associating the data center 402 E with the next hop group 450. This example mapping entry indicates that the next hop group 450 includes next hop identifiers for network address prefixes that originate in the data center 402 E. The network address prefix 430 is depicted as originating in the data center 402 E, and thus is included in the next hop group 450. The mapping table 460 can be stored in a memory and/or storage of the router 414.

The router 414 can be configured to receive one or more routing protocol messages from other routers in the data center 402A (such as the edge routers 422-424). The routing protocol messages can comprise network address prefixes and associated next hop lists. The router 414 can be configured to organize the network address prefixes and next hop lists into next hop groups (e.g., 450) based on originating data center identifiers in the network routing protocol messages. For example, the internal router 414 can receive a network routing protocol message from the edge router 422 that contains the network address prefix 430, an associated next hop list containing the identifier for the edge router 422, and an identifier for the data center 402E. The internal router 414 can be configured to add the association between the network address prefix 430 and the identifier for the edge router 422 to the next hop group 450 that is associated with the identifier for the data center 402E.

When a data packet is received by the router 414 from another router in the data center 402A, the router 414 can inspect the data packet to identify a destination network address prefix included in the data packet. If the identified network address prefix matches the network address prefix 430 then, based on the next hop group 450, the router 414 can transmit the data packet to the edge router 422. This next hop transmission relationship is illustrated in FIG. 4 as a bold line connecting the router 414 to the edge router 422. The communication lines connecting the edge router 422 to the data center 402 B, and connecting the data center 402 B to the data center 402 E are also illustrated as bold lines as an example remainder of a route the data packet could travel.

The connection between the data center 402B and the datacenter 402E is depicted as encountering a failure 470. As a result of the failure 470, communication between the routers in the data center 402A and routers in the datacenter 402E can be rerouted according to one or more network routing protocols. For example, the router 414 can receive a routing protocol message containing a new next hop list for the prefix 430 that includes the edge router 424 instead of the edge router 422. The router 414 can be configured to extract an origin data center identifier from the routing protocol message using techniques described herein. In this example, the origin data center identifier identifies the data center 402E. The router 414 can look up the entry for the data center 402E in the mapping table 460 and determine that the next hop group 450 is associated with the data center 402E.

The router 414 can then update the set of next hop identifiers in the next hop group 450 using the new next hop list in the routing protocol message.

Figure 5:
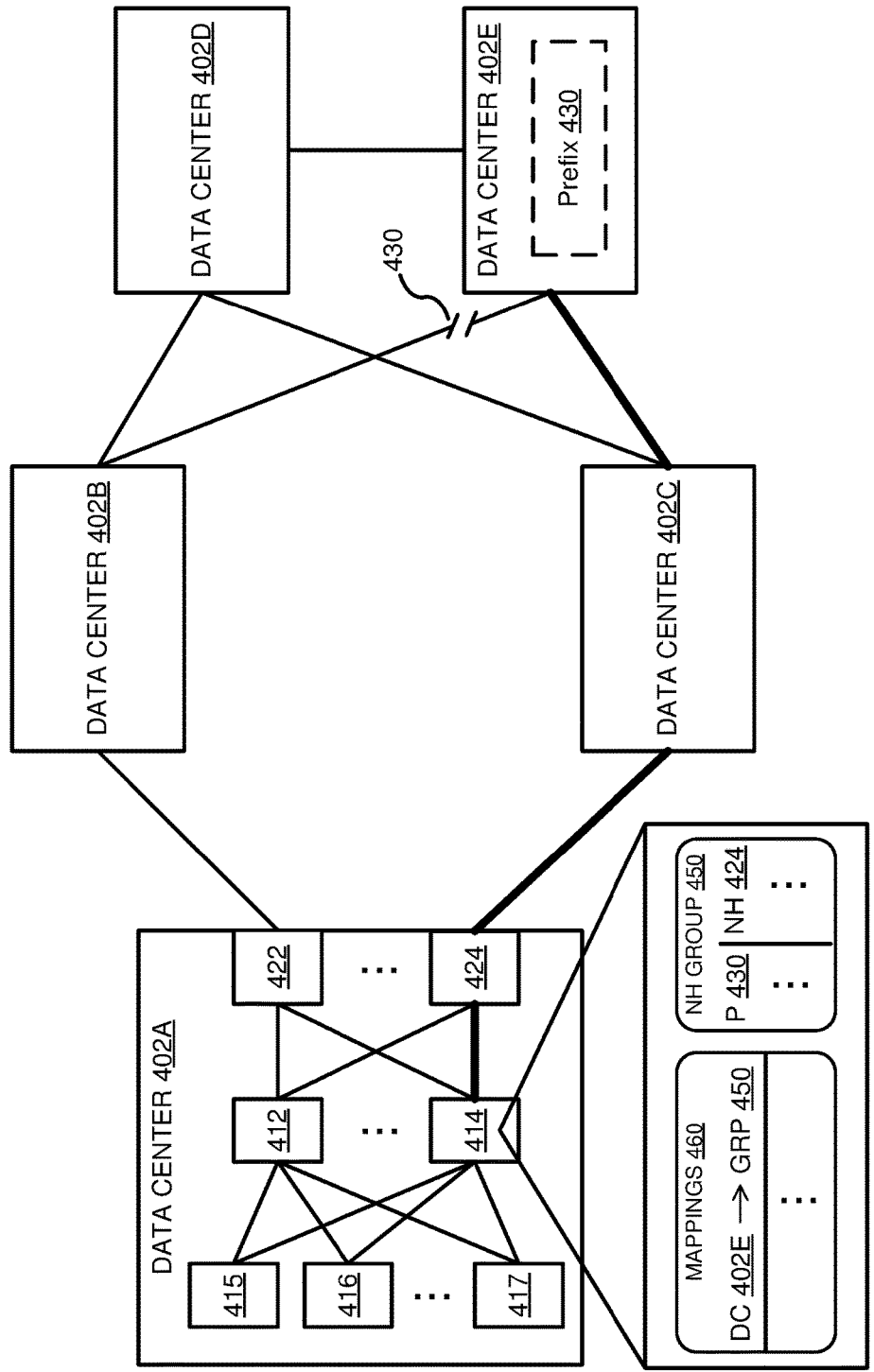

FIG. 5 depicts the example wide area network 400 after the router 414 has processed the received routing protocol message. The next hop group 450 now indicates that data packets destined for the network address prefix 430 can be routed to the edge router 424 instead of the edge router 422. To illustrate this relationship, the connection between the router 414 and the edge router 424 is depicted as a bold line. To illustrate the remainder of a new example route from the data center 402A to the data center 402E, the connection between the edge router 424 and the data center 402C, and the connection between the data center 402C and the data center 402E are also depicted as bold lines.

Although only the network address prefix 430 is depicted as originating in the data center 402E, in at least some embodiments it is possible for multiple network address prefixes to originate in a same data center. In an embodiment where multiple prefixes originated in the data center 402E, the multiple prefixes can be included in the next hop group 450. Although only a single edge router is depicted as associated with the next hop group 450, in at least some embodiments, it is possible for multiple next hop devices to be included in the next hop group 450 and used to route data packets destined for the network address prefix 430. In a particular embodiment, equal-cost multi-path (ECMP) routing can be used to route data packets across multiple next hop devices that are determined to be of equal cost based on one or more route calculation metrics.

Figure 6:
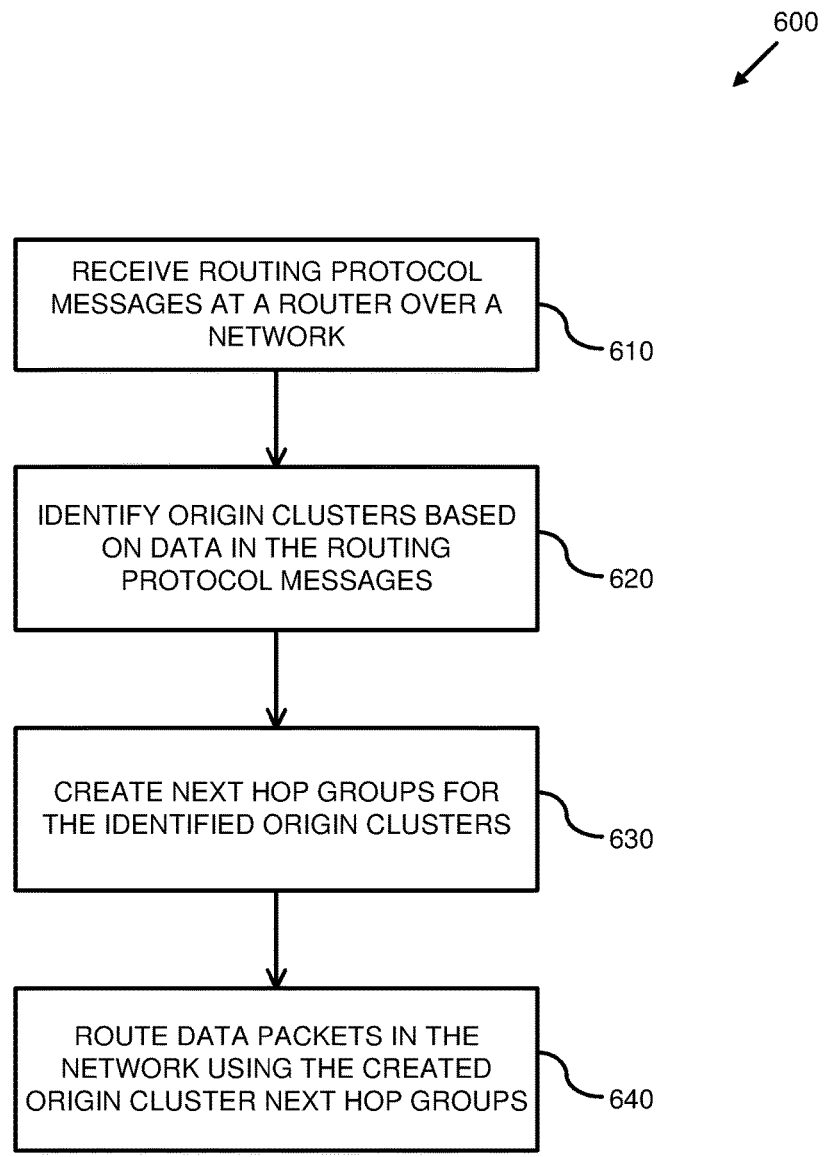
FIG. 6 is a flowchart of an example method for grouping next hops based on origin device clusters.

FIG. 6 is a flowchart of an example method 600 for grouping next hops based on origin device clusters. Any of the example systems described herein can be used to perform the example method 600.

At 610, routing protocol messages are received at a router over a network. The routing protocol messages can comprise messages describing transmission routes in the network and/or a topology of the network. Example routing protocol messages include BGP update messages, OSPF link state messages, and/or IS-IS type-length-value (TLV) segments. The router can receive the routing protocol messages via one or more network communication ports. The routing protocol messages can be transmitted to the router by one or more other routers (or other computing devices) connected to the router via the network. The routing protocol messages can contain associations between destination network address prefixes and next hop device identifiers. The associated network address prefixes and next hop device identifiers can be interpreted by the router to create a routing topology for the network. One or more of the routing protocol messages can also contain data that can be used to identify device clusters from which the routing protocol messages originated.

At 620, origin device clusters are identified based on data in the routing protocol messages. In an embodiment where the routing protocol messages comprise BGP update messages, an origin device cluster can be identified by identifying an autonomous system (AS) from which the BGP update message originated.

In an embodiment where the routing protocol messages comprise OSPF link state messages, an origin device cluster can be identified by identifying an OSPF area associated with the message. For example, origin device clusters can be defined for different OSPF areas, such as "within the local area," "in the backbone area," and "another area." Additionally or alternatively, the routing protocol messages can comprise opaque link state advertisements that contain associations between device cluster identifiers and network address prefixes. For example, the opaque link state advertisements can contain origin domain identifiers associated with network address prefixes. The router can be configured to store the associations and use them to identify origin device clusters for link state update messages based on network address prefixes contained in the link state update messages.

In an embodiment where the routing protocol messages comprise IS-IS TLV segments, an origin device cluster can be identified by identifying an IS-IS level associated with the message. For example, origin device clusters can be defined for different IS-IS levels, such as "level 1," "level 2," and "level 1-2." Additionally or alternatively, the routing protocol messages can comprise custom TLV segments that contain associations between device cluster identifiers and network address prefixes. For example, the custom TLV segments can contain associations between origin domain identifiers and network address prefixes. The router can be configured to store these associations and use them to identify origin device clusters for network address prefixes in the network topology.

In at least one embodiment, two or more of the identified origin device clusters can be controlled by separate service providers (such as separate Network Access Providers, Internet Service Providers, Internet Transport Providers, Network Backbone Providers, etc.).

At 630, next hop groups are created for the identified origin device clusters. For each origin device cluster that is identified by analyzing the routing protocol messages, the router can create a new next hop group. In at least some embodiments, the next hop groups are created by using an API to send instructions to an operating system of the router to modify a routing table of the router. For each next hop group, the router can populate the next hop group with network address prefixes and associated next hop identifiers retrieved from routing protocol messages that originated in a device cluster associated with the next hop group.

In at least some embodiments, the router can generate a mapping table that records the associations between the origin device clusters and the next hop groups. Such a mapping table can be stored in a memory and/or storage of the router.

At 640, data packets are routed in the network using the created origin device cluster next hop groups. The router can be configured to receive a data packet via a network communication port and to transmit the data packet (or a modified version of the data packet) to a next hop device via another network communication port. The router can identify the target next hop device using the next hop groups created at 630. For example, the router can extract a destination network address prefix from the data packet, look up a next hop group that is associated with the network address prefix, select a next hop identifier from the next hop group, and transmit the data packet to a next hop device associated with the selected next hop identifier. In a particular embodiment, the data packet is an IP packet and the destination network address prefix comprises one or more most-significant bits of a destination IP address contained within a header of the data packet. Additionally or alternatively, the next hop identifier is an IP address of another router in the network and the router transmits the data packet via a network communication port connected to the other router using an IP protocol.

Figure 7:
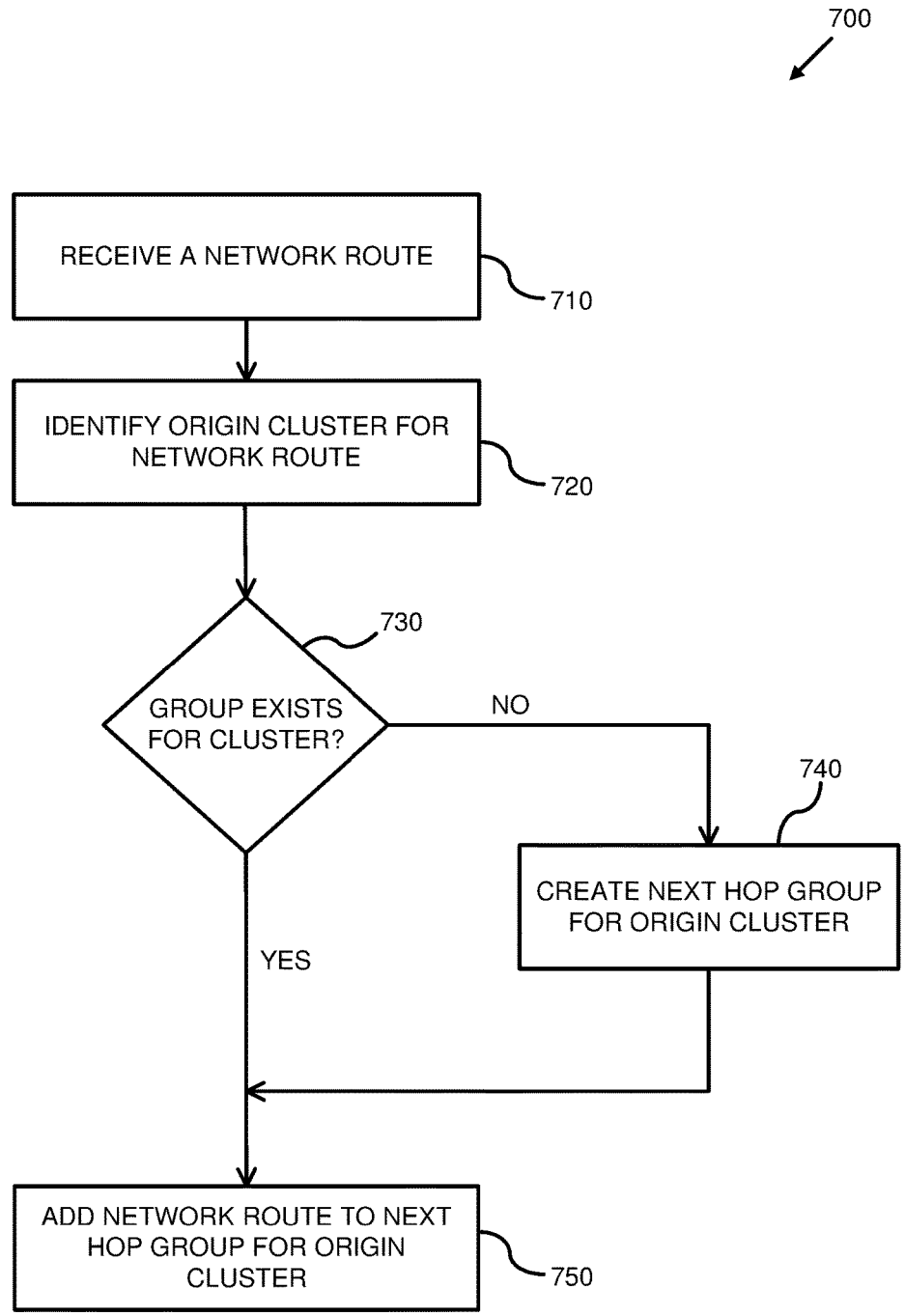
FIG. 7 is a flowchart of an example method for creating origin cluster next hop groups.

FIG. 7 is a flowchart of an example method 700 for creating origin cluster next hop groups. Any of the example systems described herein can be used to perform the example method 700.

At 710, a network route is received at a router in a computer network. The network route can comprise one or more routing protocol messages that describe a communication path to a destination network address prefix. For example, the network route can identify one or more next hop devices in the computer network, and associated costs for transmitting data packets to the destination network address prefix via the one or more next hop devices. In at least one embodiment, the network route comprises one or more BGP update messages comprising path attributes that identify next hop devices and network layer reachability information (NLRI) comprising a list of one or more IP address prefixes. Additionally or alternatively, the network route can comprise one or more OSPF link state advertisements and/or one or more IS-IS TLV segments.

At 720, an origin device cluster for the network route is identified. The identification of an origin device cluster can vary based on the network routing protocol(s) that are used to provide the network route to the router. In an embodiment where the network route comprises one or more BGP update messages, identifying the origin device cluster for the network route can comprise retrieving an identifier for an origin autonomous system from one or more of the BGP update messages. In an embodiment where the network route comprises one or more OSPF link state advertisements, identifying the origin device cluster can comprise identifying an OSPF area from which the one or more link state advertisements originated. In an embodiment where the network route comprises one or more IS-IS TLV segments, identifying the origin device close two can comprise identifying an IS-IS level from which the one or more TLV segments originated.

Hybrid scenarios involving more than one network routing protocol are also possible. For example, a BGP protocol may be used to exchange routing information among autonomous systems in a wide-area network, while an OSPF protocol is used to exchange routing information among routers in a local area network. In such an embodiment, a BGP update message can be received at an edge router that is connected to the local area network and configured to transmit one or more OSPF link state advertisements to routers in the local area network based on the BGP update message. In a particular embodiment, the edge router can extract an identifier for an origin autonomous system from the received BGP update message and transmit the autonomous system identifier, in association with a list of network address prefixes contained in the BGP update message, to routers in the local area network in one or more opaque link state advertisements. A router in the local area network can be configured to receive such an opaque link state advertisement and to create a record that indicates that the autonomous system identified by the identifier is an origin device cluster for one or more network address prefixes in the network address prefix list. Other hybrid protocol scenarios are also possible.

At 730, a determination is made as to whether a next hop group exists that is associated with the identified origin device cluster. In at least one embodiment, the router is configured to maintain a mapping table of records associating origin device clusters with next hop groups defined in a routing table of the router. In such an embodiment, the router can search the mapping table for a record containing an identifier for the identified origin device cluster. Example origin device cluster identifiers include BGP autonomous system identifiers, OSPF area identifiers, IS-IS level identifiers, etc.

If a next hop group associated with the origin device cluster does not exist, then at 740 a next hop group is created and associated with the origin device cluster. The router can create a new next hop group in the routing table of the router. In at least some embodiments, and API of the router can be used to update a routing table maintained by an operating system of the router to include the new next hop group. In an embodiment where the router is configured to maintain a mapping table of records associating origin device clusters with next hop groups, a new record can be added to the mapping table associating the identifier for the identified origin device cluster with an identifier for the newly created next hop group.

At 750, the network route is added to the next hop group for the origin device cluster. The network route can comprise one or more network address prefixes and one or more associated next hop device identifiers. The one or more network address prefixes in the one or more next hop device identifiers can be added to the next hop group associated with the identified origin device cluster. The next hop group can comprise associations between the one or more network address prefixes and the one or more next hop device identifiers. The next hop group can be organized to enable a look up of one or more of the next hop device identifiers given a network address prefix extracted from a data packet received at the router. The data packet can then be transmitted on to a next hop device identified by one of the retrieved next hop device identifiers.

As additional network routes are received at the router, the example method 700 can be repeated to create additional next hop groups for different origin device clusters and/or add additional network address prefixes to existing next hop groups. Thus, after network routes have converged, the router can contain a set of next hop groups that group network address prefixes based on common origin device clusters.

In at least some embodiments, a subsequent routing protocol message can be received comprising an update for a network route. One of the origin device clusters can be identified that is associated with the network route. One of the next hop groups that is associated with the one of the origin device clusters can be accessed and updated using the update for the network route.

Figure 8:
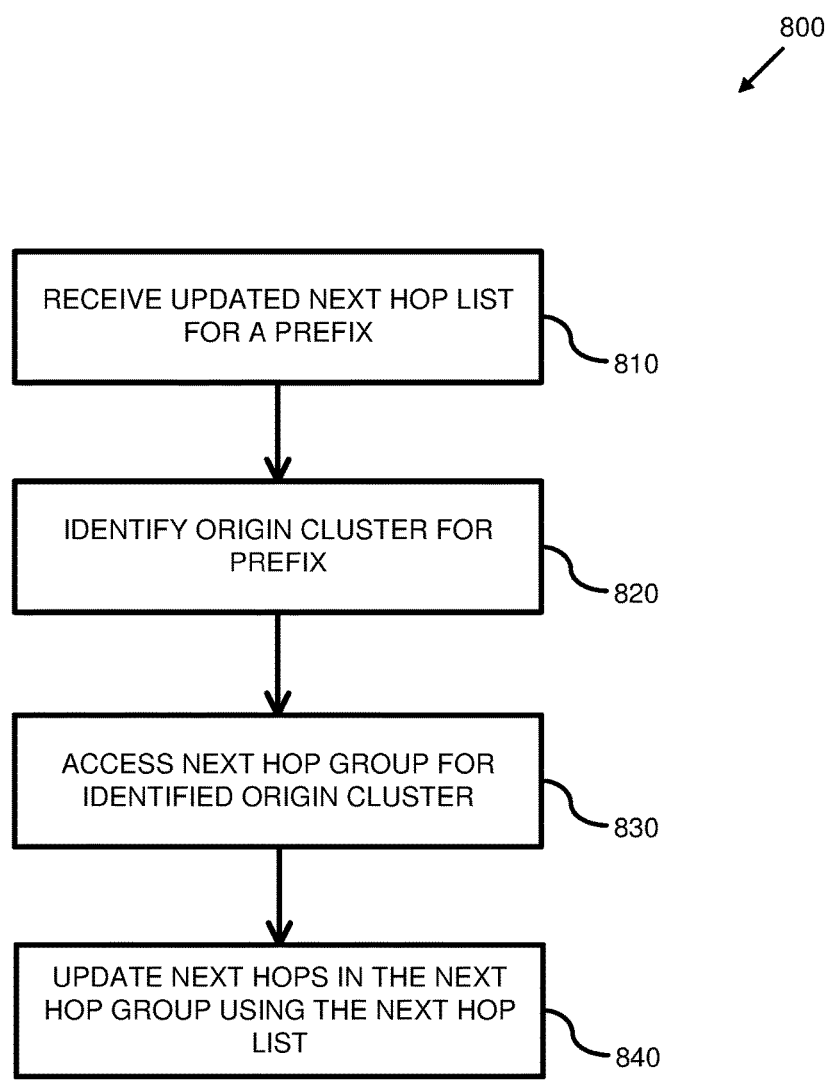
FIG. 8 is a flowchart of an example method for updating next hops for a prefix using origin cluster next hop groups.

FIG. 8 is a flowchart of an example method 800 for updating next hops for a network address prefix using origin device cluster next hop groups. Any of the example systems described herein can be used to perform the example method 800.

At 810, an updated next hop list is received for a network address prefix. The updated next hop list can be received as part of a routing protocol message (such as a BGP update message, an OSPF link state advertisement, an IS-IS TLV segment, etc.). The updated next hop list can indicate that one or more network routes for transmitting data packets to the network address prefix have changed. The updated next hop list, in some cases, can indicate that one or more network routes to the network address prefix should be withdrawn and/or one or more new network routes to the network address prefix should be added. Additionally or alternatively, the updated next hop list can contain one or more identifiers (such as network addresses) for next hop devices to be used when transmitting data packets towards the network address prefix.

At 820, an origin device cluster for the network address prefix is identified. The origin device cluster for the prefix can be identified based on data in the routing protocol message containing the updated next hop list. In embodiments where the updated next hop list is received as part of a BGP update message, an autonomous system routing path contained in the BGP update message can be inspected to identify an originating autonomous system, from which the BGP update message was first transmitted. In such an embodiment, the originating autonomous system can be treated as an origin device cluster.

In embodiments where the updated next hop list is received as part of an OSPF link state advertisement, the link state advertisement can be inspected to identify an OSPF area from which it was initially transmitted. In at least one such embodiment, the OSPF area can be treated as the origin device cluster. In embodiments where the updated next hop list is received as part of one or more IS-IS TLV segments, the one or more IS-IS TLV segments can be inspected to identify an IS-IS level from which the one or more TLV segments were first transmitted. In at least one such an embodiment, the identified IS-IS level can be treated as an origin device cluster.

Additionally or alternatively, the router receiving the updated next hop list for the prefix can store associations between known network address prefixes and origin device clusters. In such an embodiment, a record containing an association between the network address prefix and an origin the device cluster can be retrieved using the provided network address prefix. In at least one embodiment, such associations between origin device clusters and network address prefixes can be received as part of one or more OSPF opaque link state advertisements and subsequently stored for later reference. In a different or further embodiment, such associations between origin device clusters and the network address prefixes can be received as part of one or more custom TLV segments.

At 830, a next hop group for the identified origin device cluster is accessed. The next hop group can be one of one or more next hop groups defined in a routing table of a router. The next hop group to be accessed can be identified based on mappings between origin device clusters and next hop groups that are stored in a memory and/or storage of the router. The identifier for the origin device cluster (such as a BGP autonomous system identifier, an OSPF area identifier, an IS-IS level identifier, etc.) can be used to retrieve a mapping entry from the mappings, wherein the retrieved entry contains an identifier for a next hop group that is associated with the origin device cluster. The identifier for the next hop group can be used to access the next hop group in the router's routing table.

At 840, next hops in the next hop group are updated using the updated next hop list. Updating the next hop group can comprise replacing one or more next hop device identifiers stored in the next hop group with one or more next hop device identifiers in the updated next hop list. In at least some cases, all of the current next hop device identifiers in the next hop group are deleted and replaced by the next hop device identifiers in the updated next hop list. In some scenarios, more than one network address prefix is associated with the next hop group. For example, in addition to the network address prefix for which the updated next hop list was received, one or more other prefixes that are also associated with the same origin device cluster can also be associated with the next hop group. In such scenarios, updating the next hop group can have the effect of changing available next hop device identifiers that will be used for routing data packets to any of the network address prefixes associated with the next hop group. Thus, in at least some cases, if the same updated next hop list is received for another network address prefix associated with the same origin device cluster, it can be discarded. Since the next hop group for the origin device cluster has already been updated, there is no need to update the next hop group using the same next hop list a second time.

FIG. 9 depicts an example BGP update message 900 that can be used as a routing protocol message in any of the examples described herein. The BGP update message 900 contains an AS_PATH path attribute 912 comprising a sequence of autonomous system (AS) identifiers for AS's through which the message was routed. A last identifier 914 can be an identifier associated with an AS from which the BGP update message 900 originated. In at least some embodiments, BGP AS's can serve as separate device clusters and the identifier 914 can be used to identify an origin device cluster for the message 900.

The BGP update message 900 contains a Network Layer Reachability Information (NLRI) field 918. The NLRI field 918 can contain a list of one or more network address prefixes. FIG. 9 depicts the NLRI field 918 as containing an IP address prefix of "62.112.65.0/24," however the type, size, and count of network address prefixes contained in the NLRI field 918 can vary.

The BGP update message contains a NEXT_HOP path attribute 916. The NEXT_HOP path attribute 916 can contain an identifier (such as a network address) for a next hop device for use in routing data packets destined for the network address prefix contained in the NLRI field 918. The value of the NEXT_HOP path attribute 916 can be a network address (such as an IP address) of another router in the network that should be used to transmit data packets towards the network address prefix contained in the NLRI field 918.

In a particular embodiment, a router can be configured to receive the BGP update message 900, search for the AS_PATH attribute 912, and extract the AS identifier 914 from the sequence of AS identifiers in the value of the AS_PATH attribute 912. The router can search for a next hop group that is associated with the AS identifier 914. For example, the router can search a mapping table that associates AS identifiers with next hop groups, and retrieve an entry from the mapping table with an AS identifier that matches the AS identifier 914. If a next hop group does not exist that is associated with the AS identifier 914, then the router can create a new next hop group and associate it with the AS identifier 914. The router can extract the one or more network address prefixes from the NLRI field 918 and the next hop identifier from the NEXT_HOP path attribute 916. The router can add the extracted one or more network address prefixes and next hop identifier to the next hop group associated with the AS identifier 914.

The router can be configured to process multiple BGP routing messages and identify multiple distinct AS's in a network based on AS_PATH attributes in the BGP routing messages. The router can treat the identified AS's as distinct origin device clusters. The router can comprise a routing table generator configured to determine an originating AS in the network for a given network address prefix and create a next hop group in a routing table that is related to the identified AS. When a routing path to the identified AS changes, the routing table generator can update routes for all network address prefixes originating from the identified AS by changing the next hop identifiers in the next hop group associated with the identifier AS.

In a different or further embodiment, data in the BGP routing messages, other than the origin AS identifier, can be used to identify an origin device cluster. For example, the BGP routing messages can contain BGP community information that can be used to identify sets of computing devices connected to a network that are designated as "communities." In such an embodiment, a router can be configured to identify BGP communities based on the BGP community information and treat the different BGP communities as separate origin device clusters.

In different or further embodiments, BGP routing messages can contain local preferences and/or multi-exit discriminators, which can also be used to identify origin device clusters in the network.

In at least one embodiment, the router can identify one or more transit AS's, wherein a transit AS's route data packets to one or more other AS's, but are not origins for any network address prefixes. In at least some cases, the router can generate a next hop group for a transit AS and associate it with network prefixes for all AS's that sit behind the transit AS in the network. For example, in an Internet scenario, an AS for an Internet Service Provider (ISP) can be identified as a transit AS, and a next hop group can be created that contains network address prefixes that originate in all AS's that sit behind the ISP.

In embodiments where link state routing protocols (such as OSPF and IS-IS) are used, different areas or levels in the network can be treated as separate origin device clusters. For example, in an embodiment where an OSPF protocol is used, from the perspective of a given router, separate origin device clusters can be defined that group network address prefixes based on whether a given prefix originates in a same OSPF area as the router, in the OSPF backbone area, or in another OSPF area. In an embodiment where an IS-IS protocol is used, from the perspective of a given router, separate origin device clusters can be defined that group network address prefixes based on whether a given prefix originates in IS-IS level 1, IS-IS level 2, or IS-IS level 1-2.

In at least some link state protocols (such as OSPF and IS-IS), it is not possible for a router in a non-backbone area to identify an origin system for a routing message that did not originate in the local area or the backbone. In at least some embodiments where such a protocol is used, instead of clustering all prefixes that do not originate in the local area or backbone into a single next hop group, separate next hop groups can be created that group network address prefixes that do not originate in the local area or the backbone area based on shared next hops. For example, a router can be configured to create a next hop group for all network address prefixes that originate in the local area, to create a second next hop group for all network address prefixes that originate in the backbone area, and to create separate next hop groups that group other network address prefixes based on shared sets of next hops.

Alternatively, a link state protocol can be extended to provide origin information for network address prefixes. For example, in an embodiment where an OSPF protocol is used, a new opaque link state advertisement can be transmitted that identifies an origin OSPF area for one or more network address prefixes. In an embodiment where an IS-IS protocol is used, a custom TLV segment can be defined that contains origin IS-IS level information for a given network address prefix. In a particular embodiment, a new "origin level" type can be defined with a length that is large enough to encode a network address prefix and an identifier for an IS-IS level from which the network address prefix originates. A TLV segment can be generated that contains the new type identifier, the length, and a value that contains the encoded network address prefix and IS-IS level identifier.

In such embodiments, origin areas or levels for network address prefixes that originate outside the local area and the backbone area can be identified and treated as separate origin device clusters.

Figure 10:
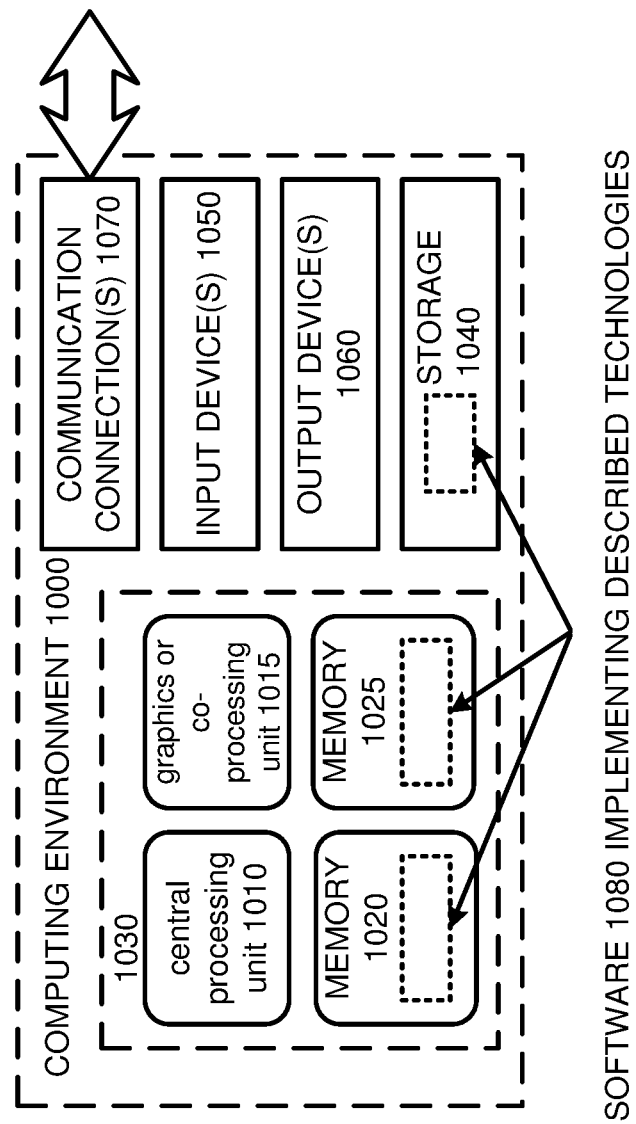
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.). In at least some embodiments, the computing environment 1000 can be a router as described herein.

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, solid state storage, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (AS SPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. We therefore claim as our invention all that comes within the scope of these claims.

What is claimed is:

1. A router, comprising:
   a routing table manager configured to:
      receive routing protocol messages comprising Internet Protocol (IP) address prefixes and next hop identifiers,
      analyze the routing protocol messages to identify computing device network groups from which the routing protocol messages originated,
      create next hop groups for the identified computing device network groups, from which the routing protocol messages originated, in a routing table, and
      assign the IP address prefixes and next hop identifiers to the created next hop groups based on common computing device network groups from which the routing protocol messages originated; and
   a routing protocol controller configured to:
      receive a data packet comprising one of the IP address prefixes; and
      route the data packet to another router in the computer network based on an entry in the next hop group associated with the one of the IP address prefixes.

2. The router of claim 1, wherein the routing table manager is further configured to:
   receive a subsequent routing protocol message comprising one of the IP address prefixes and another next hop identifier;
   analyze the second subsequent routing protocol message to identify one of the computing device network groups;
   look up one of the next hop groups associated with the one of the computing device network groups; and
   update entries in the one of the next hop groups to associate the IP address prefix with the another next hop identifier.

3. The router of claim 1, wherein:
   at least one of the routing protocol messages is a Border Gateway Protocol (BGP) message; and
   the analyzing the at least one of the routing protocol messages to identify the computing device network group from which the routing protocol message originated comprises searching the BGP message for an identifier associated with an originating Autonomous System.

4. The router of claim 1, wherein the routing table manager is further configured to:
   determine that a next hop group for an identified computing device network group does not exist in the routing table; and
   responsive to the determining, create the next hop group in the routing table for the identified computing device network group.

5. The router of claim 1, wherein the routing table manager is further configured to:
   search a mapping table containing associations between computing device network group identifiers and next hop groups; and
   retrieve a record from the mapping table associating an identifier for one of the computing device network groups with one of the next hop groups in the routing table.

6. A method comprising:
   receiving routing protocol messages at a router over a computer network;
   identifying origin device clusters based on data in the routing protocol messages, wherein identifying an origin device cluster for a routing protocol message comprises analyzing data in the routing protocol message to identify a network device cluster from which the routing protocol originated;
   creating next hop groups for the origin device clusters;
   assigning network routes identified by the received routing protocol messages to the created next hop groups based on common origin device clusters for the network routes; and
   routing data packets in the computer network using the created next hop groups for the origin device clusters.

7. The method of claim 6, further comprising:
   identifying a network route described in one of the routing protocol messages;
   identifying an origin device cluster for the network route;
   determining that a next hop group associated with the identified origin device cluster does not exist;
   creating a next hop group and associating it with the identified origin device cluster; and
   adding the network route to the created next hop group.

8. The method of claim 7, wherein associating the next hop group with the identified origin device cluster comprises adding a mapping entry to a mapping table, stored in a memory of the router, that associates an identifier of the origin device cluster with an identifier of the next hop group.

9. The method of claim 6, further comprising:
   receiving a subsequent routing protocol message comprising an update for a network route;
   identifying one of the origin device clusters associated with the network route;
   accessing one of the next hop groups associated with the one of the origin device clusters; and
   updating the one of the next hop groups using the update for the network route.

10. The method of claim 6, wherein one of the origin device clusters is controlled by a first service provider and another of the origin device clusters controlled by a second service provider.

11. The method of claim 6, wherein the routing protocol messages comprise Open Shortest Path First (OSPF) messages; and
   identifying the origin device clusters comprises identifying OSPF areas associated with the OSPF messages.

12. The method of claim 6, wherein the routing protocol messages comprise OSPF messages comprising opaque link state advertisements (LSAs); and
   identifying the origin device clusters comprises retrieving origin domain identifiers from the opaque LSAs.

13. The method of claim 6, wherein the routing protocol messages comprise Intermediate System to Intermediate System (IS-IS) messages; and
   identifying the origin device clusters comprises identifying IS-IS levels associated with the IS-IS messages.

14. The method of claim 6, wherein the routing protocol messages comprise IS-IS messages comprising custom type-length-value (TLV) segments; and
   identifying the origin device clusters comprises retrieving origin domain identifiers from the custom TLV segments.

15. A system, comprising a network router configured to:
   receive, over a computer network, network routing protocol messages comprising network address prefixes and associated next hop lists;
   organize the network address prefixes and next hop lists into next hop groups based on originating data center identifiers in the network routing protocol messages, wherein a next hop group is created for each originating data center identifier, wherein the network address prefixes and associated next hop lists are organized into the created next hop groups based on common origin device clusters for the network address prefixes; and
   route data packets to data centers of the originating data center identifiers over the computer network using the next hop groups associated with the originating data center identifiers.

16. The system of claim 15, wherein organizing the network address prefixes and next hop lists into next hop groups comprises:
   locating one of the originating data center identifiers in one of the received routing protocol messages;
   searching for a next hop group associated with the one originating data center identifier in a routing table of the network router;
   determining that a next hop group associated with the one originating data center identifier does not exist;
   creating a next hop group in the routing table and associating the created next hop group with the one originating data center identifier; and
   adding a network address prefix and next hop list contained in the one of the received routing protocol messages to the next hop group associated with the one originating data center identifier.

17. The system of claim 16, wherein associating the next hop group with the one originating data center identifier comprises storing a mapping record associating the one originating data center identifier with an identifier for the next hop group in a mapping table in a memory of the network router.

18. The system of claim 15, wherein the network router is further configured to:
   receive a subsequent network routing protocol message comprising an updated next hop list for one of the network address prefixes;
   identify an originating data center for the network address prefix;
   look up one of the next hop groups in the routing table that is associated with the identified originating data center; and
   update the next hop group using the updated next hop list.

19. The system of claim 15, further comprising:
multiple edge routers in a same data center as the network router, wherein the multiple edge routers are configured to transmit the network routing protocol messages to the network router; and
wherein the network router is further configured to route data packets with a given network address prefix to a first edge router, of the multiple edge routers, based on an entry in one of the next hop groups associated with an origin data center for the given network address prefix.

20. The system of claim 19, wherein the network router is further configured to:
receive a network routing protocol message from one of the edge routers indicating that a network route for the given network address prefix has changed;
determine an origin data center for the given network address prefix;
look up the one of the next hop groups associated with the origin data center; and
update the one of the next hop groups based on the changes to the network route, wherein updating the one of the next hop groups configures the network router to subsequently route data packets with the given network address prefix to a second edge router, of the multiple edge routers.

* * * * *